United States Patent
Park et al.

(10) Patent No.: US 11,044,598 B2
(45) Date of Patent: Jun. 22, 2021

(54) MOBILE ITS STATION AND METHOD OF TRANSMITTING/RECEIVING A MESSAGE THEREOF

(71) Applicant: LG ELECTRONICS INC., Seoul (KR)

(72) Inventors: Suho Park, Seoul (KR); Hyunho Ki, Seoul (KR); Hansung Kim, Seoul (KR); Jaeseung Bae, Seoul (KR); Changhun Sung, Seoul (KR); Jaehwan Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 345 days.

(21) Appl. No.: 16/246,140

(22) Filed: Jan. 11, 2019

(65) Prior Publication Data
US 2020/0107186 A1     Apr. 2, 2020

(30) Foreign Application Priority Data
Oct. 1, 2018    (WO) ................ PCT/KR2018/011620

(51) Int. Cl.
*H04W 8/24*    (2009.01)
*G06F 8/65*    (2018.01)
(Continued)

(52) U.S. Cl.
CPC ............... *H04W 8/24* (2013.01); *G06F 8/65* (2013.01); *H04W 4/40* (2018.02); *H04W 28/0284* (2013.01); *H04W 72/0486* (2013.01)

(58) Field of Classification Search
CPC ..... H04W 8/24; H04W 4/40; H04W 28/0284; H04W 72/0486; G06F 8/65; G06F 8/38; G06F 8/66; G06F 8/71
See application file for complete search history.

(56) References Cited

U.S. PATENT DOCUMENTS

2006/0294514 A1* 12/2006 Bauchot ................... G06F 8/65
    717/173
2011/0009151 A1* 1/2011 Miucic ................. H04L 1/0006
    455/522
(Continued)

FOREIGN PATENT DOCUMENTS

KR   10-2010-0107800 A    10/2010
KR      20100107800 A  *  10/2010
(Continued)

OTHER PUBLICATIONS

Torrent -Moreno et al ;"Vehicle-to-Vehicle Communication: Fair Transmit Power Control for Safety-Critical Information"; 20 pages (Year: 2009).*

(Continued)

*Primary Examiner* — Wei Y Zhen
*Assistant Examiner* — Brahim Bourzikz
(74) *Attorney, Agent, or Firm* — Birch, Stewart, Kolasch & Birch, LLP

(57) ABSTRACT

A method of controlling a first mobile Intelligent Transport System (ITS) station. The method includes identifying a second mobile ITS station having a software version updatable on the first mobile ITS station based on receiving a message from at least one neighbor mobile ITS station through a first communication interface; making a request for a software update file for the updatable software version to the second mobile ITS station through the first communication interface; and receiving the software update file from the second mobile ITS station while a connection to the second mobile ITS station is maintained through the first communication interface.

12 Claims, 11 Drawing Sheets

(51) Int. Cl.
*H04W 72/04* (2009.01)
*H04W 28/02* (2009.01)
*H04W 4/40* (2018.01)

(56) References Cited

U.S. PATENT DOCUMENTS

| | | |
|---|---|---|
| 2014/0245278 A1 | 8/2014 | Zellen |
| 2015/0220321 A1* | 8/2015 | Jung .................. G06F 8/65 717/169 |
| 2015/0227359 A1* | 8/2015 | Todoroki ............ G06F 8/65 717/169 |
| 2015/0242198 A1* | 8/2015 | Tobolski ............ G06F 8/65 717/172 |
| 2019/0108014 A1* | 4/2019 | Nakamura .......... H04L 67/34 |
| 2019/0174547 A1* | 6/2019 | Khoryaev ........... H04W 4/46 |
| 2020/0167144 A1* | 5/2020 | You .................... H04W 4/50 |
| 2020/0264864 A1* | 8/2020 | Yang .................. H04L 9/30 |

FOREIGN PATENT DOCUMENTS

| | | |
|---|---|---|
| KR | 10-1360705 B1 | 2/2014 |
| KR | 10-2015-0064474 A | 6/2015 |
| KR | 10-2015-0092883 A | 8/2015 |

OTHER PUBLICATIONS

Tan et al ;"Measurement and Analysis of Wireless Channel Impairments in DSRC Vehicular Communications";7 pages (Year: 2008).*
Gerla et al ;"Content distribution in VANETs";10 pages (Year: 2013).*
Guan et al ;"Adaptive Congestion Control of DSRC Vehicle Networks for Collaborative Road Safety Applications"; 5 pages (Year: 2011).*
Matolak et al; 5 GHZ Wireless Channel Characterization for Vehicle to Vehicle Communications; 7pages (Year: 2005).*
Autolitano et al;"Understanding the Channel Busy Ratio Metrics for Decentralized Congestion Control in VANETs";6 pages (Year: 2014).*

\* cited by examiner

Select channel having lowest Channel Busy Ratio

| CH 172 | CH 174 | CH 176 | CH 178 | CH 180 | CH 182 | CH 184 |
|---|---|---|---|---|---|---|
| Service | Service | Service | Service | Service | Service | Service |
| 10 MHz | 10 MHz | 10 MHz | 10 MHz | 10 MHz | 10 MHz | 10 MHz |

Progress an update intensively in case of stopping or going slow

Progress a system update and reboot in case of stopping

MOBILE ITS STATION AND METHOD OF TRANSMITTING/RECEIVING A MESSAGE THEREOF

CROSS-REFERENCE TO RELATED APPLICATIONS

Pursuant to 35 U.S.C. § 119(a), this application claims the benefit of earlier filing date and right of priority to PCT Application No. PCT/KR2018/011620 filed on Oct. 1, 2018, the contents of which are hereby incorporated by reference herein in their entirety.

BACKGROUND OF THE INVENTION

Field of the Invention

The present invention relates to a mobile ITS station and method of transmitting/receiving a message thereof, and more particularly, to a method for a first mobile ITS station to transmit/receive a message to/from a neighbor mobile ITS station through a first communication interface.

Discussion of the Related Art

A vehicle traditionally functions as a transportation means of a user, and provides user's driving convenience by being equipped with various sensors, electronic devices and the like for user's convenience. Particularly, many ongoing efforts are made to develop and research Advanced Driver Assistance System (ADAS) for user's driving convenience and autonomous vehicles.

IEEE developed Wireless Access for the Vehicular Environment (WAVE) in 2010, which conceptually includes technical specifications for physical and MAC layers for vehicle communication in form of IEEE 802.11p and descriptions of security, network management and the like in form of IEEE 1609. Dedicated Short-Range Communication (DSRC) interface developed based on IEEE 802.11p and IRRR 1609 technologies is an application for Intelligent Transport System (ITS) related to road safety.

In addition, in V2X communication environment, a software update for a V2X system of a mobile ITS station is mandatory. Yet, regarding the related art introduced so far, it is necessary to connect to cellular communication (e.g., C-V2X) or it is necessary for a user to update a system manually in a mobile ITS station. Or, it is necessary to receive a file required for an update from an infrastructure (e.g., roadside unit) through Vehicle to Infrastructure (V2I). However, such a method has difficulty in consistently updating a system in a situation that a mobile ITS station is being driven.

As describe above, a software update method of a mobile ITS station according to a related art has difficulty in consistently updating a system in a situation what the mobile ITS station is being driven at a high speed.

SUMMARY OF THE INVENTION

Accordingly, embodiments of the present invention are directed to a mobile ITS station and method of transmitting/receiving a message thereof that substantially obviate one or more problems due to limitations and disadvantages of the related art.

One object of the present invention is to provide a method of performing a software update through V2X communication in a situation that cellular communication (e.g., C-V2X) is not supported or a situation that a mobile ITS station is being driven.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a method of transmitting/receiving a message transceived by a first mobile ITS station with a neighbor mobile ITS station through a first communication interface according to one embodiment of the present invention includes identifying a second mobile ITS station having a software version updatable on the first mobile ITS station based on receiving a message from at least one neighbor mobile ITS station, making a request for a software update file for the updatable software version to the second mobile ITS station through the first communication interface, and receiving the software update file from the second mobile ITS station while a connection to the second mobile ITS station is maintained through the first communication interface.

In another aspect of the present invention, as embodied and broadly described herein, a first mobile ITS station transceiving a message with a neighbor mobile ITS station through a first communication interface according to another embodiment of the present invention includes a communication device and a processor configured to identify a second mobile ITS station having a software version updatable on the first mobile ITS station based on receiving a message from at least one neighbor mobile ITS station, make a request for a software update file for the updatable software version to the second mobile ITS station through the first communication interface, and receive the software update file from the second mobile ITS station while a connection to the second mobile ITS station is maintained through the first communication interface.

Accordingly, embodiments of the present invention provide several advantages. First of all, in one technical aspect, the present invention provides a method of identifying a second mobile ITS station having a software version updatable in a first mobile ITS station from a message received from at least one neighbor mobile ITS station.

Through this, the first mobile ITS station can receive a software update file from a neighbor mobile ITS station by Peer to Peer (P2P) and also transmit the software update file to another neighbor mobile ITS station by functioning as an uploader.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

Figure 1:
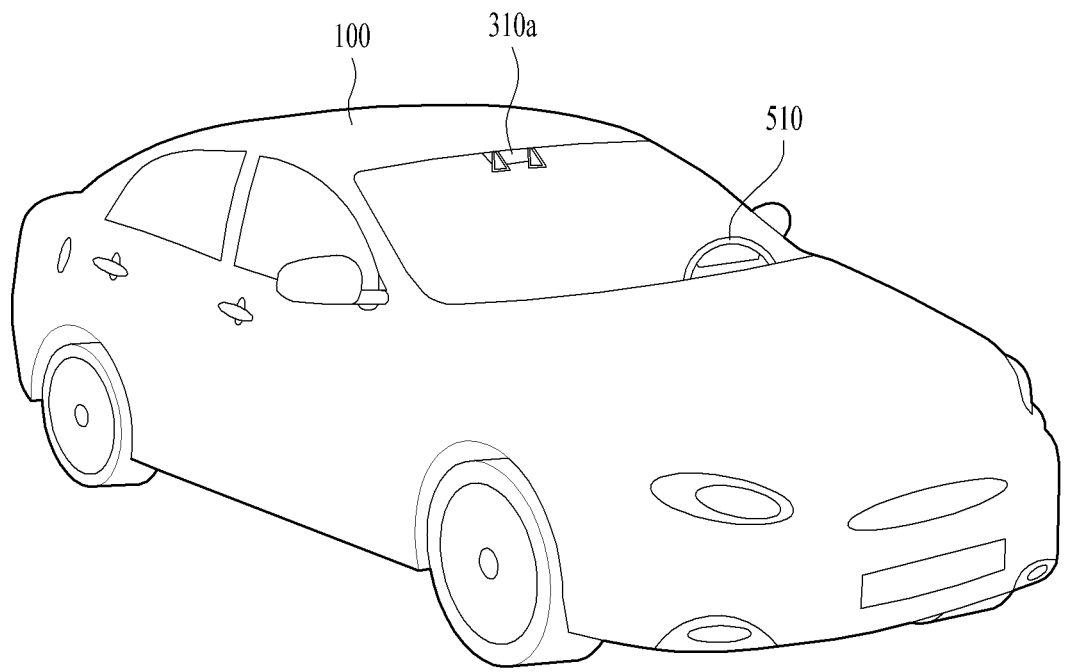
FIG. 1 is a diagram showing an exterior of a vehicle according to one embodiment of the present invention.
Figure 1:
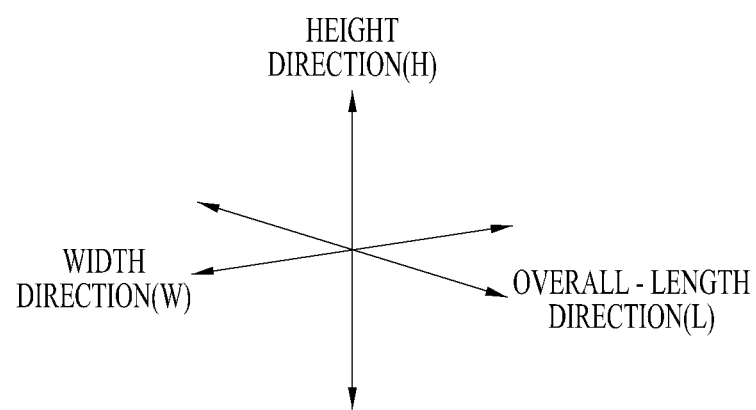

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present disclosure.

Although the terms "first," "second," etc., may be used herein to describe various components, these components should not be limited by these terms. These terms are only used to distinguish one component from another component. When a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise. In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include an automobile and a motorcycle. Hereinafter, a description will be given based on an automobile. A vehicle as described in this specification may include all of an internal combustion engine vehicle including an engine as a power source, a hybrid vehicle including both an engine and an electric motor as a power source, and an electric vehicle including an electric motor as a power source. In the following description, "the left side of the vehicle" refers to the left side in the forward driving direction of the vehicle, and "the right side of the vehicle" refers to the right side in the forward driving direction of the vehicle.

Figure 2:
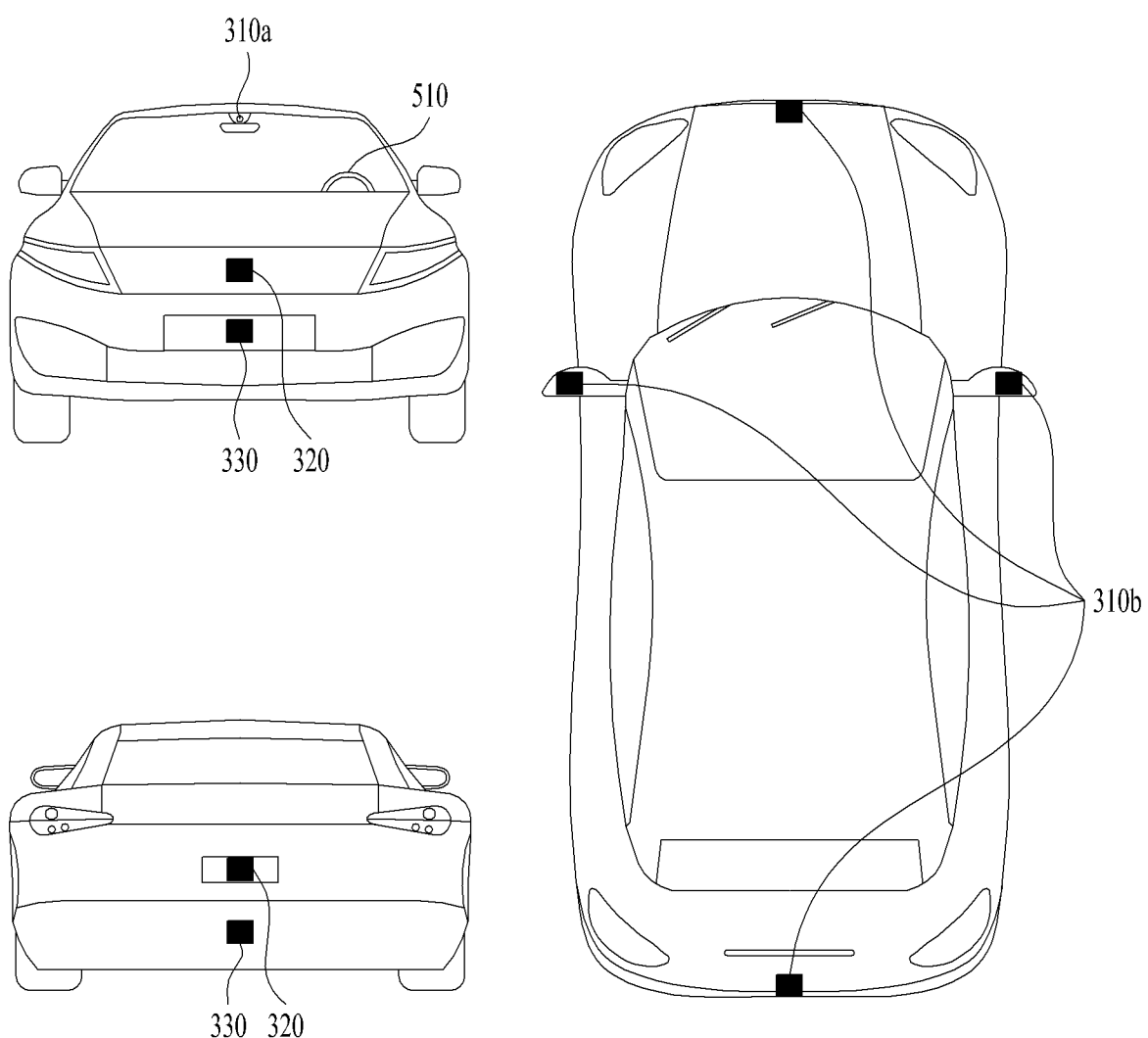
FIG. 2 is a diagram showing a vehicle externally viewed in various angles according to one embodiment of the present invention.
Figure 3:
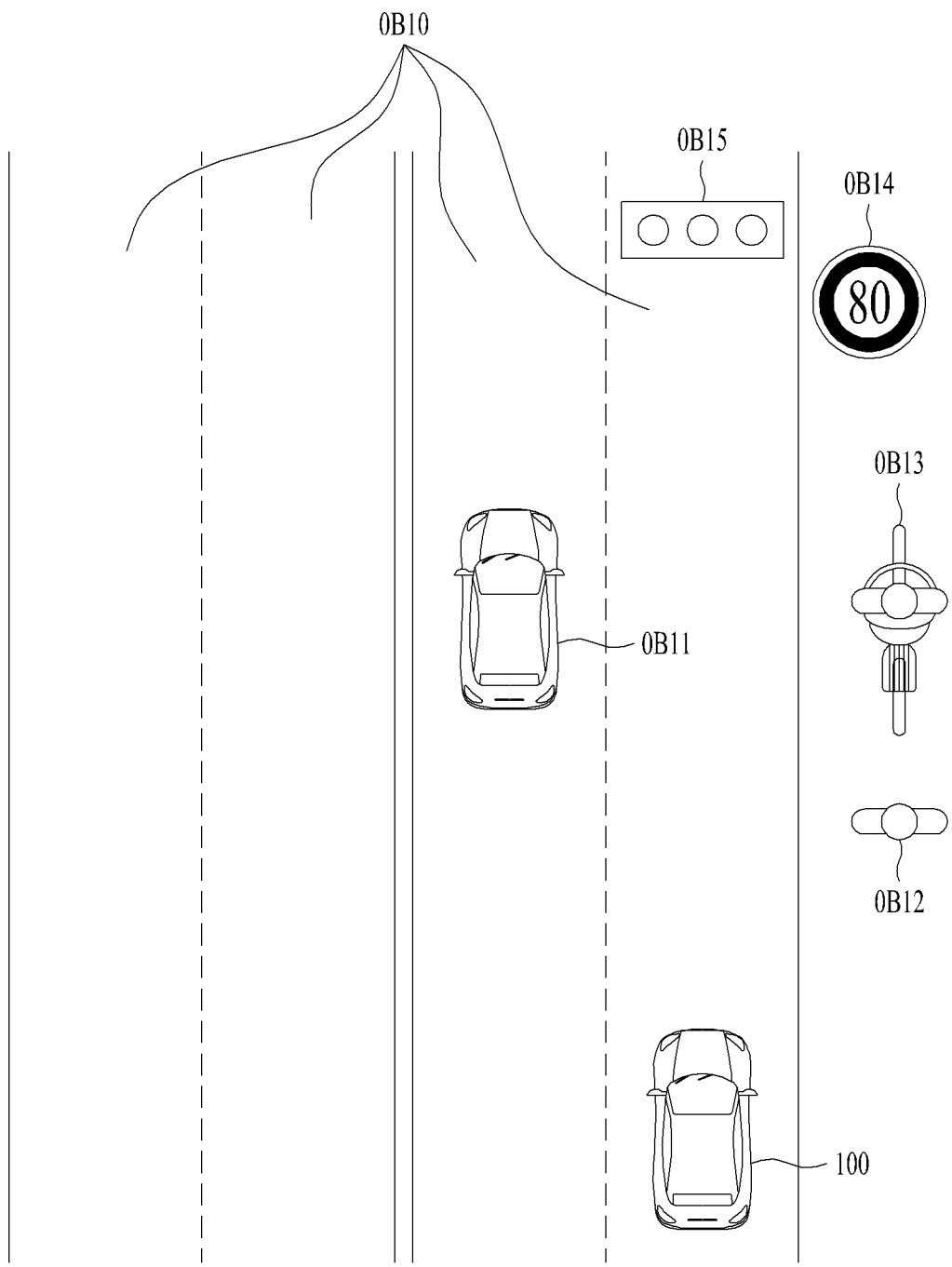
FIGS. 3 and 4 are diagrams illustrating an object according to one embodiment of the present invention.
Figure 4:
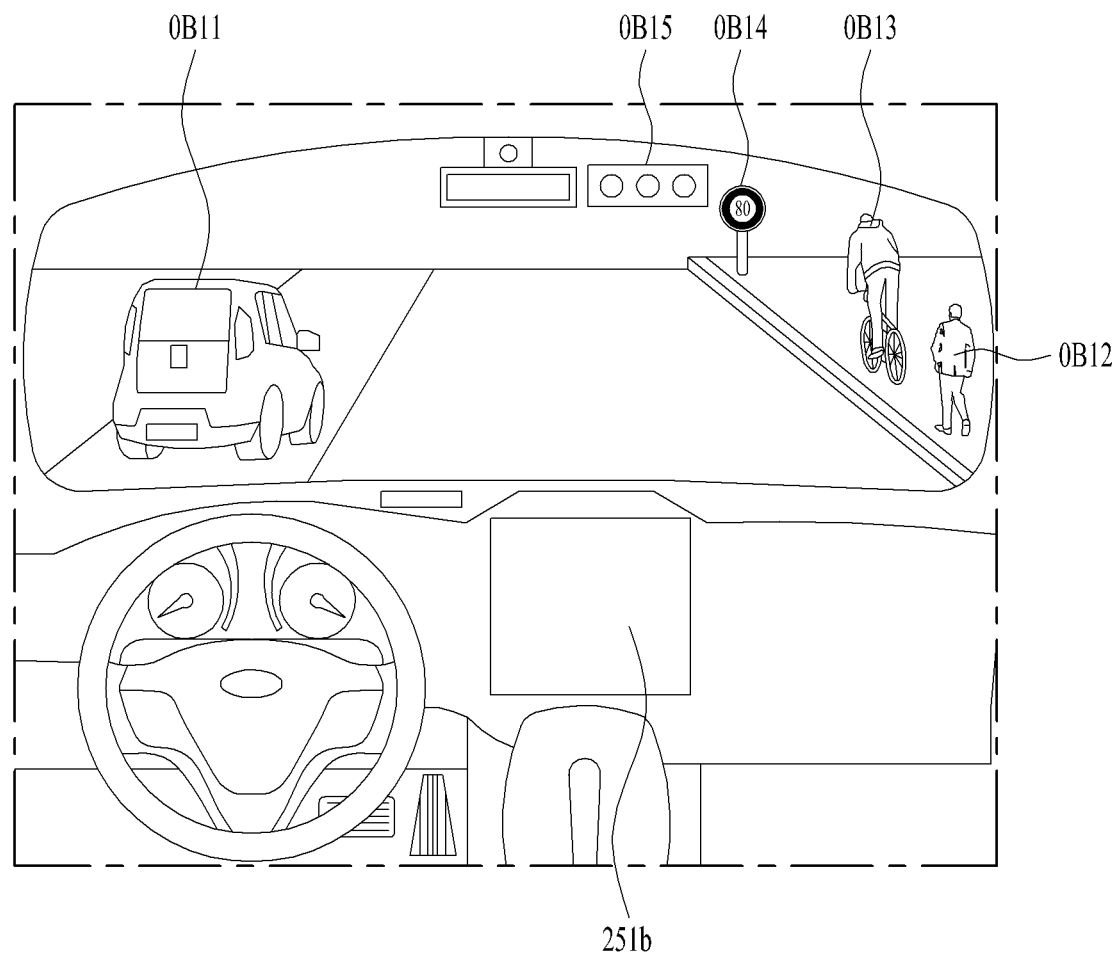
Figure 5:
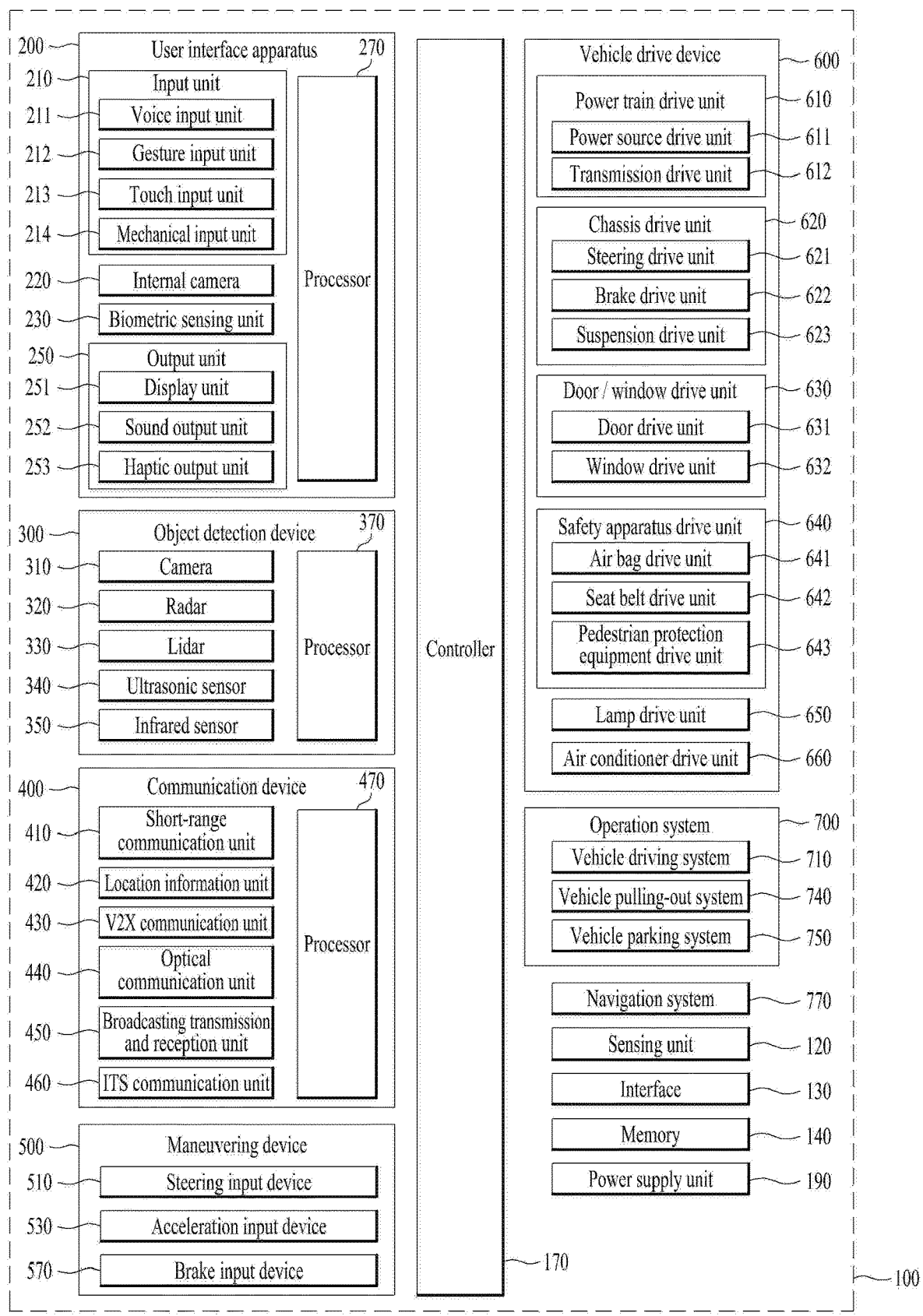
FIG. 5 is a block diagram illustrating a vehicle according to one embodiment of the present invention.

FIG. 1 is a view of the external appearance of a vehicle according to an embodiment of the present disclosure, FIG. 2 is different angled views of a vehicle according to an embodiment of the present disclosure, FIGS. 3 and 4 are views for explanation of objects according to an embodiment of the present disclosure, and FIG. 5 is a block diagram illustrating a vehicle according to an embodiment of the present disclosure.

Referring to FIGS. 1 to 5, a vehicle 100 may include a plurality of wheels, which are rotated by a power source, and a steering input device 510 for controlling a driving direction of the vehicle 100. The term "overall length" means the length from the front end to the rear end of the vehicle 100, the term "overall width" means the width of the vehicle 100, and the term "overall height" means the height from the bottom of the wheel to the roof. In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

As illustrated in FIG. 5, the vehicle 100 may include the user interface device 200, the object detection device 300, the communication device 400, the maneuvering device 500, a vehicle drive device 600, the operation system 700, a navigation system 770, a sensing unit 120, an interface 130, a memory 140, a controller 170, and a power supply unit 190. In some embodiments, the vehicle 100 may further include other components in addition to the aforementioned components, or may not include some of the aforementioned components.

The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The interface 130 may serve as a passage for various kinds of external devices that are connected to the vehicle 100. For example, the interface 130 may have a port that is connectable to a mobile terminal and may be connected to the mobile terminal via the port. In this instance, the interface 130 may exchange data with the mobile terminal.

In addition, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170. In some embodiments, the memory 140 may be integrally formed with the controller 170, or may be provided as an element of the controller 170.

The controller 170 may control the overall operation of each unit inside the vehicle 100. The controller 170 may be referred to as an Electronic Controller (ECU). The power supply unit 190 may supply power required to operate each component under control of the controller 170. In particular, the power supply unit 190 may receive power from, for example, a battery inside the vehicle 100.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Further, each of the sensing unit 120, the interface unit 130, the memory 140, the power supply unit 190, the user interface device 200, the object detection device 300, the communication device 400, the maneuvering device 500, the vehicle drive device 600, the operation system 700, and the navigation system 770 may have an individual processor or may be incorporated in the controller 170.

The user interface device 200 is provided to support communication between the vehicle 100 and a user. The user interface device 200 may receive a user input, and provide information generated in the vehicle 100 to the user. The vehicle 100 may enable User Interfaces (UI) or User Experience (UX) through the user interface device 200.

The user interface device 200 may include an input unit 210, an internal camera 220, a biometric sensing unit 230, an output unit 250, and a processor 270. Each component of the user interface device 200 may be separated from or integrated with the afore-described interface 130, structurally or operatively.

In some embodiments, the user interface device 200 may further include other components in addition to the aforementioned components, or may not include some of the aforementioned components. The input unit 210 is configured to receive information from a user, and data collected in the input unit 210 may be analyzed by the processor 270 and then processed into a control command of the user.

The input unit 210 may include a voice input unit 211, a gesture input unit 212, a touch input unit 213, and a mechanical input unit 214. The voice input unit 211 may convert a voice input of a user into an electrical signal. The converted electrical signal may be provided to the processor 270 or the controller 170.

The voice input unit 211 may include one or more microphones. The gesture input unit 212 may convert a gesture input of a user into an electrical signal. The converted electrical signal may be provided to the processor 270 or the controller 170. The gesture input unit 212 may include at least one selected from among an infrared sensor and an image sensor for sensing a gesture input of a user.

The touch input unit 213 may convert a user's touch input into an electrical signal. The converted electrical signal may be provided to the processor 270 or the controller 170. The touch input unit 213 may include a touch sensor for sensing a touch input of a user. The mechanical input unit 214 may include at least one selected from among a button, a dome switch, a jog wheel, and a jog switch. An electrical signal generated by the mechanical input unit 214 may be provided to the processor 270 or the controller 170.

The internal camera 220 may acquire images of the inside of the vehicle 100. The processor 270 may sense a user's condition based on the images of the inside of the vehicle 100. The processor 270 may acquire information on an eye gaze of the user. The processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output. The output unit 250 may include at least one selected from among a display unit 251, a sound output unit 252, and a haptic output unit 253. The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display. The sound output unit 252 converts an electrical signal from the processor 270 or the controller 170 into an audio signal, and outputs the audio signal. Thus, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output. The processor 270 may control the overall operation of each unit of the user interface device 200. In some embodiments, the user interface device 200 may include a plurality of processors 270 or may not include the processor 270.

When the user interface device 200 does not include the processor 270, the user interface device 200 may operate under control of the controller 170 or a processor of a different device inside the vehicle 100. In addition, the user interface device 200 may be referred to as a display device for a vehicle.

The user interface device 200 may operate under control of the controller 170. The object detection device 300 is used to detect an object outside the vehicle 100. The object detection device 300 may generate object information based on sensing data. The object information may include information about the presence of an object, location information of the object, information on distance between the vehicle and the object, and the speed of the object relative to the vehicle 100. The object may include various objects related to travelling of the vehicle 100.

Referring to FIGS. 3 and 4, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc. The lane OB10 may be a lane in which the vehicle 100 is traveling (hereinafter, referred to as the current driving lane), a lane next to the current driving lane, and a lane in which a vehicle travelling in the opposite direction is travelling. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100. The pedestrian OB12 may be a person in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle that is located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface. The object detection device 300 may include a camera 310, a radar 320, a lidar 330, an ultrasonic sensor 340, an infrared sensor 350, and a processor 370. Each component of the object detection device may be separated from or integrated with the sensing unit, structurally or operatively.

In some embodiments, the object detection device 300 may further include other components in addition to the aforementioned components, or may not include some of the aforementioned components. The camera 310 may be located at an appropriate position outside the vehicle 100 in order to acquire images of the outside of the vehicle 100. The camera 310 may be a mono camera, a stereo camera 310a, an around view monitoring (AVM) camera 310b, or a 360-degree camera.

Using various image processing algorithms, the camera 310 may acquire location information of an object, information on distance to the object, and information on speed relative to the object. For example, based on change in size over time of an object in acquired images, the camera 310 may acquire information on distance to the object and information on speed relative to the object. For example, the camera 310 may acquire the information on distance to the object and the information on speed relative to the object by utilizing a pin hole model or by profiling a road surface.

For example, the camera 310 may acquire the information on distance to the object and the information on the speed relative to the object, based on information on disparity of stereo images acquired by a stereo camera 310a. For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate. In yet another example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370. The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object. The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme. The lidar 330 may be implemented as a drive type lidar or a non-drive type lidar. When implemented as the drive type lidar, the lidar 300 may rotate by a motor and detect an object in the vicinity of the vehicle 100.

When implemented as the non-drive type lidar, the lidar 300 may utilize a light steering technique to detect an object located within a predetermined distance from the vehicle 100. The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100. The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100. The infrared sensor 350 may include an infrared light transmission unit and an infrared light reception unit. The infrared sensor 340 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100. The processor 370 may control the overall operation of each unit of the object detection device 300.

The processor 370 may detect or classify an object by comparing data sensed by the camera 310, the radar 320, the lidar 330, the ultrasonic sensor 340, and the infrared sensor 350 with pre-stored data. The communication device 400 is configured to perform communication with an external device. Here, the external device may be a nearby vehicle, a mobile terminal, or a server.

To perform communication, the communication device 400 may include at least one selected from among a transmission antenna, a reception antenna, a Radio Frequency (RF) circuit capable of implementing various communication protocols, and an RF device. The communication device 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470.

In some embodiments, the communication device 400 may further include other components in addition to the aforementioned components, or may not include some of the aforementioned components. The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device. The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal. In some embodiments, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic information from the traffic system and provide the traffic information to the controller 170. In another example, the ITS communication unit 460 may receive a control signal from the traffic system, and provide the control signal to the controller 170 or a processor provided in the vehicle 100.

The processor 470 may control the overall operation of each unit of the communication device 400. In some embodiments, the communication device 400 may include a plurality of processors 470, or may not include the processor 470. When the communication device 400 does not include the processor 470, the communication device 400 may operate under control of the controller 170 or a processor of a device inside of the vehicle 100.

In addition, the communication device 400 may implement a vehicle display device, together with the user interface device 200. In this instance, the vehicle display device may be referred to as a telematics device or an audio video navigation (AVN) device. The communication device 400 may operate under control of the controller 170.

The maneuvering device 500 is configured to receive a user input for driving the vehicle 100. In the manual mode, the vehicle 100 may operate based on a signal provided by the maneuvering device 500. The maneuvering device 500 may include a steering input device 510, an acceleration input device 530, and a brake input device 570.

The vehicle drive device 600 is configured to electrically control the operation of various devices of the vehicle 100. The vehicle drive device 600 may include a power train drive unit 610, a chassis drive unit 620, a door/window drive unit 630, a safety apparatus drive unit 640, a lamp drive unit 650, and an air conditioner drive unit 660. In some embodiments, the vehicle drive device 600 may further include other components in addition to the aforementioned components, or may not include some of the aforementioned components.

In addition, the vehicle drive device 600 may include a processor. Each unit of the vehicle drive device 600 may include its own processor. The power train drive unit 610 may control the operation of a power train. The power train drive unit 610 may include a power source drive unit 611 and a transmission drive unit 612.

The power source drive unit 611 may control a power source of the vehicle 100. The chassis drive unit 620 may control the operation of a chassis. The chassis drive unit 620 may include a steering drive unit 621, a brake drive unit 622, and a suspension drive unit 623. The door/window drive unit 630 may perform electronic control of a door apparatus or a window apparatus inside the vehicle 100. The door/window drive unit 630 may include a door drive unit 631 and a window drive unit 632.

The safety apparatus drive unit 640 may perform electronic control of various safety apparatuses provided inside the vehicle 100. The safety apparatus drive unit 640 may include an airbag drive unit 641, a safety belt drive unit 642, and a pedestrian protection equipment drive unit 643. The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100. The vehicle drive device 600 may include a processor. Each unit of the vehicle dive device 600 may include its own processor.

The vehicle drive device 600 may operate under control of the controller 170. The operation system 700 is a system for controlling the overall driving operation of the vehicle 100. The operation system 700 may operate in the autonomous driving mode. The operation system 700 may include the driving system 710, the vehicle pulling-out system 740, and the vehicle parking system 750.

In some embodiments, the operation system 700 may further include other components in addition to the aforementioned components, or may not include some of the aforementioned component. In addition, the operation system 700 may include a processor. Each unit of the operation system 700 may include its own processor.

The driving system 710 may perform driving of the vehicle 100. The driving system 710 may perform driving of the vehicle 100 by providing a control signal to the vehicle drive device 600 in response to reception of navigation information from the navigation system 770.

The vehicle pulling-out system 740 may perform an operation of pulling the vehicle 100 out of a parking space. The vehicle pulling-out system 740 may perform an operation of pulling the vehicle 100 out of a parking space, by providing a control signal to the vehicle drive device 600 in response to reception of navigation information from the navigation system 770.

The vehicle parking system 750 may perform an operation of parking the vehicle 100 in a parking space. The vehicle parking system 750 may perform an operation of parking the vehicle 100 in a parking space, by providing a control signal to the vehicle drive device 600 in response to reception of navigation information from the navigation system 770.

The navigation system 770 may provide navigation information. The navigation information may include at least one selected from among map information, information on a set destination, information on a route to the set destination, information on various objects along the route, lane information, and information on a current location of the vehicle.

Figure 6:
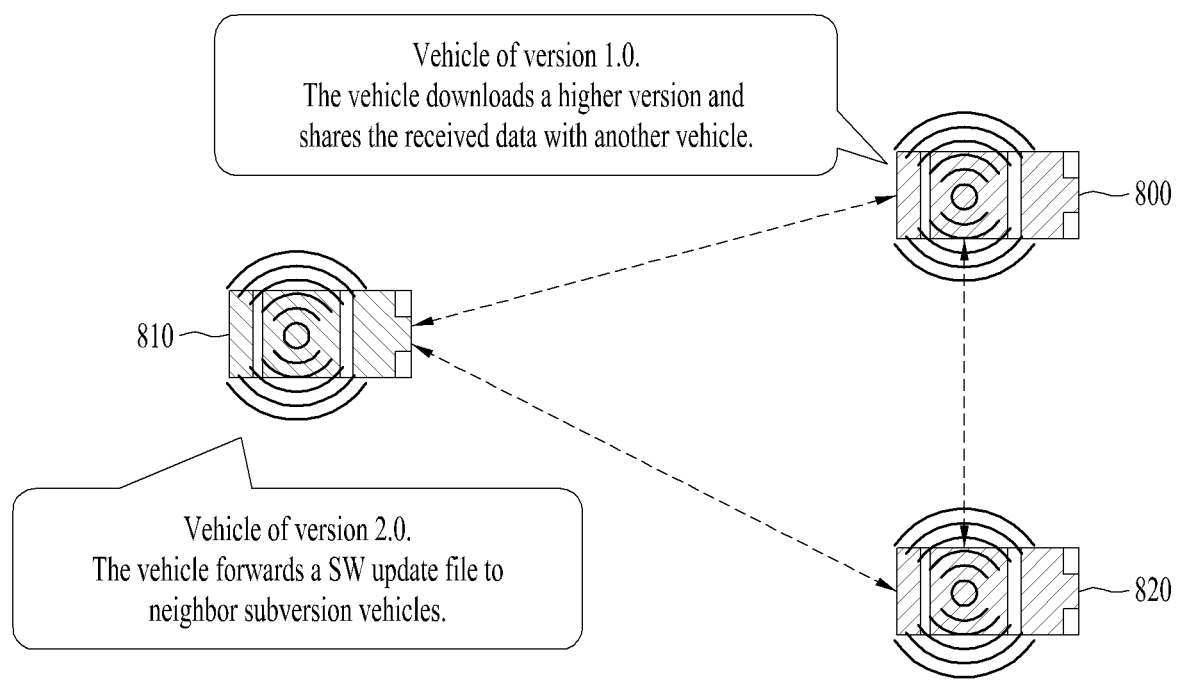
FIG. 6 is a diagram illustrating a method of transmitting/receiving a message in a mobile ITS station using Peer-to-Peer network (hereinafter called P2P) system according to one embodiment of the present invention.

FIG. 6 is a diagram illustrating a method for a mobile ITS station to transmit/receive a message according to one embodiment of the present invention. Particularly, the present invention provides a method for a first mobile ITS station to transceive a message with a second mobile ITS station using a Peer-to-Peer network (hereinafter named P2P) system. P2P (or, communication network between equivalent layers) means a communication network configured by depending on calculation and bandwidth performance of nodes participating in network configuration rather than focusing on a relatively small number of servers. In some implementations of the following description, a mobile ITS station may be equivalently interpreted as one of vehicles shown in FIGS. 1 to 5.

In some implementations, a system of a mobile ITS station 800 may include at least one software. And, each of the at least one software may need a periodic or aperiodic update. The present invention provides a method of directly transmitting/receiving a software update file between mobile ITS stations by vehicle-to-vehicle direct communication.

Yet, various contents, real-time information (e.g., high-precision map information) required for telematics unit, and various information for updating sensors for safety of autonomous driving vehicle or functions of the sensors can be transceived between mobile ITS stations. For example, the functions of the sensors may include Adaptive Cruise Control (ACC), glare-free high beam, adaptive light control, automatic parking, automotive night vision, blind spot monitor, collision avoidance system, driver monitoring system, intersection assistant, intelligent speed adaptation, lane departure warning system, lane change assistance, pedestrian protection system, traffic sign recognition, etc. In the following, embodiments of the present invention shall be described by taking a software update file as an example.

FIG. 6 shows that the software version of the mobile ITS station 800 and the mobile ITS station 820 is 1.0 and also shows that the software version of the mobile ITS station 810 is 2.0. The present invention provides a method for the mobile ITS stations 800 and 820 to receive an update file of software from the mobile ITS station 810 through vehicle-to-vehicle direct communication.

Figure 7:
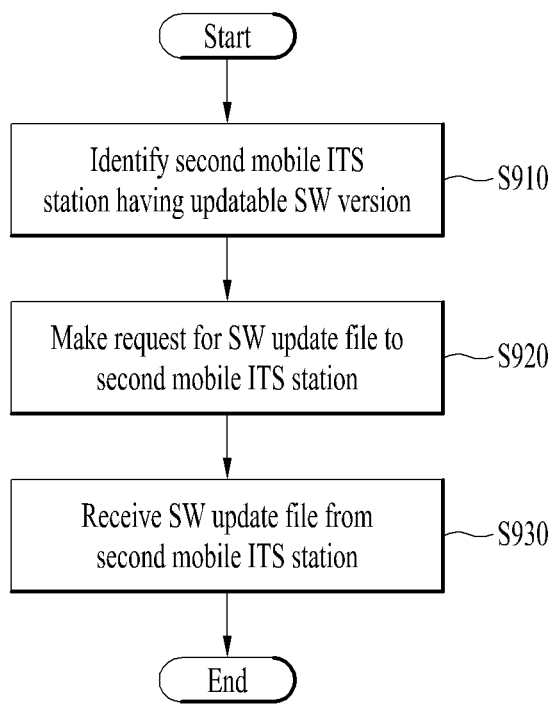
FIG. 7 is a flowchart illustrating a method of transmitting/receiving a message in a first mobile ITS station according to one embodiment of the present invention.

With reference to FIGS. 7 to 13, various embodiments of transceiving a software update file between mobile ITS stations are described as follows. In particular, FIG. 7 is a flowchart illustrating a method of transmitting/receiving a message in a first mobile ITS station according to one embodiment of the present invention. The first mobile ITS station can receive a message from at least one neighbor mobile ITS station. Here, assume that a message transceived between the mobile ITS stations through a first communication interface (e.g., Dedicated Short Range Communication (DSRC) interface) contains software version information of the mobile ITS stations.

The first mobile ITS station can identify a second mobile ITS station having a software version updatable in the first mobile ITS station through the received message (S910). Subsequently, the first mobile ITS station can make a request for a software update file of an updatable software version to the second mobile ITS station through the first communication interface (S920).

Finally, while the connection to the second mobile ITS station is maintained through the first communication interface, the first mobile ITS station can receive the software update file from the second mobile ITS station (S930).

Figure 8:
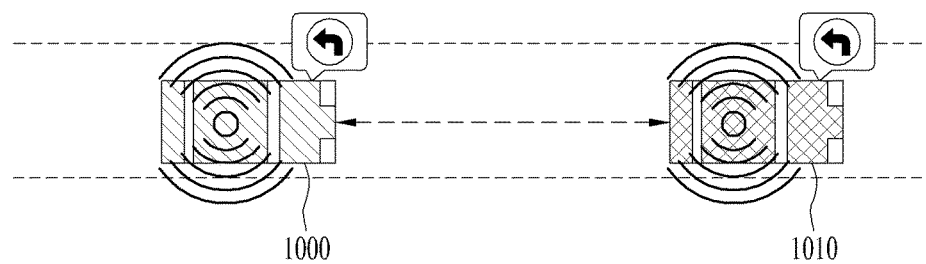
FIG. 8 is a diagram illustrating a method of securing a time enough for a first mobile ITS station to transmit/receive a message according to one embodiment of the present invention.

FIG. 8 is a diagram illustrating a method for a first mobile ITS station to transmit/receive a message according to one embodiment of the present invention. Particularly, the present invention provides the two methods in the following to secure a time enough to transceive the aforementioned software update file between a first mobile ITS station 1000 and a second mobile ITS station 1010.

First of all, the first mobile ITS station 1000 can identify the second mobile ITS station 1010 currently driving a route similar to that of the first mobile ITS station 1000 and make a request for a software update file. For instance, when identifying the second mobile ITS station 1010, the first mobile ITS station 1000 can additionally determine whether the second mobile ITS station drives the same route of at least one section of the route of the first mobile ITS station.

Secondly, if the software update file transmission/reception between the first mobile ITS station 1000 and the second mobile ITS station 1010 starts, the first mobile ITS station 1000 can control its speed or direction so that a distance from the second mobile ITS station 1010 can be maintained equal to or smaller than a preset value (e.g., 100 m). Particularly, in order to control the speed or direction of the first mobile ITS station 1000, the processor of the first mobile ITS station 1000 can control the respective units of the vehicle drive device 600 or the operation system 700.

As described above, according to an embodiment of the present invention, a time enough can be secured to transceive a software update file between the first mobile ITS station 1000 and the second mobile ITS station 1010.

According to another embodiment of the present invention, the first mobile ITS station 1000 can control its speed or direction so that a communication sensitivity instead of a physical distance from the second mobile ITS station 1010 can be maintained within a prescribed threshold. Particularly, the first mobile ITS station 1000 can determine whether the communication sensitivity is maintained within the prescribed threshold through the transmitting antenna, the receiving antenna and the RF device, which are the components of the communication device 400 shown in FIG. 5.

Figure 9:
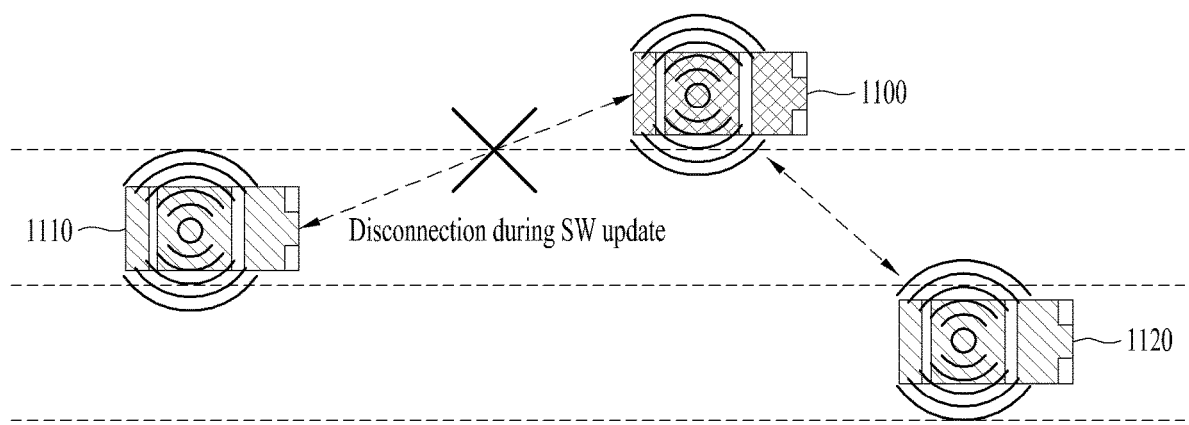
FIG. 9 is a diagram illustrating a method for a first mobile ITS station to cope with a communication disconnected situation in the course of message transmission/reception according to one embodiment of the present invention.

Next, FIG. 9 is a diagram illustrating a method for a first mobile ITS station to transmit/receive a message according to one embodiment of the present invention. Particularly, the present invention provides two methods for coping with a communication disconnected situation while a first mobile ITS station 1100 is receiving a software update file from a second mobile ITS station 1110.

First of all, the first mobile ITS station 1100 can additionally search for a third mobile ITS station 1120 connectable through a first communication interface (e.g., DSRC interface). In this instance, the first mobile ITS station 1100 can make a request for the rest of a software update file (e.g., a portion of a software update file supposed to be received after a timing of disconnection) to the third mobile ITS station 1120 and then receive it from the third mobile ITS station 1120.

Secondly, the first mobile ITS station 1100 can reattempt the connection to the second mobile ITS station 1110 through a second communication interface (e.g., ITS-G5 interface, LTE PC5 interface, etc.) different from the first communication interface. In this instance, the first mobile ITS station 1100 can continue to receive the rest of a software update file (e.g., a portion of a software update file supposed to be received after a timing of disconnection) from the second mobile ITS station 1110.

Figure 10:
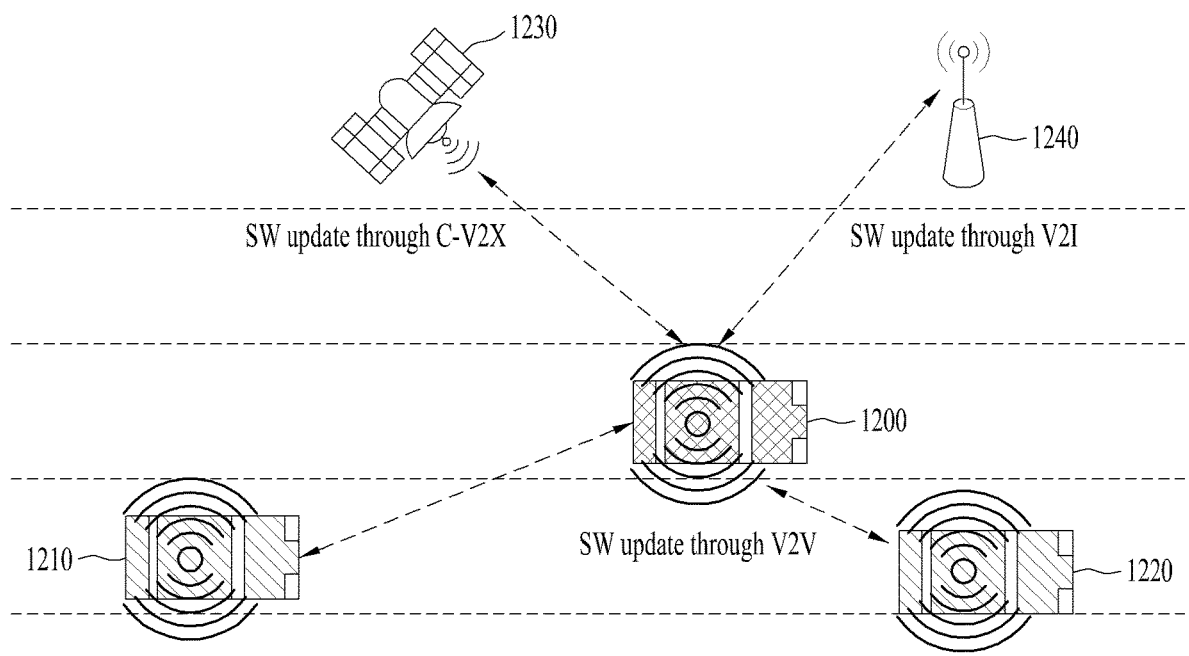
FIG. 10 is a diagram illustrating a method for a first mobile ITS station to transmit/receive a message using a plurality of communication interfaces together according to one embodiment of the present invention.

FIG. 10 is a diagram illustrating a method for a first mobile ITS station to transmit/receive a message according to one embodiment of the present invention. Referring to FIG. 10, a first mobile ITS station 1200 can receive a software file using a plurality of communication devices. Particularly, the first mobile ITS station 1200 can directly receive software files from neighbor mobile ITS stations 1210 and 1220 through Vehicle to Vehicle (V2V) communication or receive software files from different components 1230 and 1240 through Cellular V2X (C-V2X) communication or Vehicle to Infrastructure (V2I) communication. The different component may include Road Side Unit (RSU) of a DSRC interface.

Figure 11:
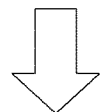
FIG. 11 is a diagram illustrating a method for a first mobile ITS station to transmit/receive a message through a specific one of a plurality of channels according to one embodiment of the present invention.

FIG. 11 is a diagram illustrating a method for a first mobile ITS station to transmit/receive a message according to one embodiment of the present invention. As describe above, a first communication interface may include a Dedicated Short Range Communication (DSRC) interface. Generally, as shown in FIG. 11, a frequency band of a DSRC interface is configured with a plurality of channels CH172 to CH184 divided by 10 MHz. A first mobile ITS station can make a request for a software update file to a second mobile ITS station through a specific channel of a DSRC interface and then receive it from the second mobile ITS station.

The present invention provides a method for a first mobile ITS station to make a request for a software update file to a second mobile ITS station through a specific file having a low channel busy ratio among a plurality of channels of a DSRC interface and receive the requested software update file. The low channel busy ratio may mean that a power level of a corresponding channel is equal to or lower than a predetermined value.

The first mobile ITS station can confirm a service channel having a lowest Channel Busy Ratio (CBR) among a plurality of channels of the DSRC interface through a control channel (e.g., CH178) of the DSRC interface. For instance, the service channel having the lowest CBR can be announced by the control channel.

Subsequently, the first mobile ITS station can make a request for a software update file to the second mobile ITS station using the confirmed service channel and receive the software update file from the second mobile ITS station. According to another embodiment of the present invention, if there exist a plurality of types of software supposed to be updated on a first mobile ITS station, a plurality of service channels can be assigned to the first mobile ITS station.

Figure 12:
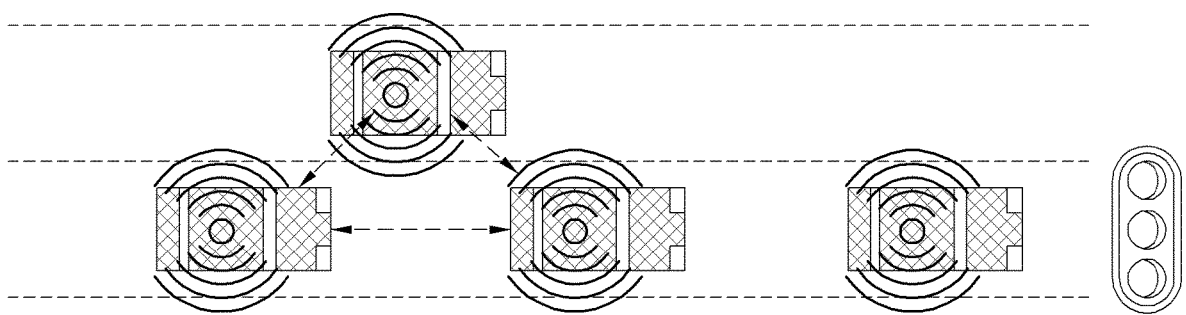
FIGS. 12 and 13 are diagrams illustrating a method for a first mobile ITS station to transmit/receive a message, if a prescribed condition is met, according to one embodiment of the present invention.

FIG. 12 is a diagram illustrating a method for a first mobile ITS station to transmit/receive a message according to one embodiment of the present invention. According to one embodiment of the present invention, a reception of a software file from another mobile ITS station may not be performed when a vehicle is driving fast for which a V2X safety service is important. Namely, since a safety service is prioritized higher than a software update, a reception of a software file can be performed only if a vehicle proceeds at a reduced speed or stops.

For instance, after completing a reception of a software update file from a second mobile ITS station, a first mobile ITS station can reboot a system of the first mobile ITS station if the first mobile ITS station stops or proceeds at a speed lower than a prescribed speed. In some implementations, a first mobile ITS station according to another embodiment of the present invention can confirm a congestion estimated section in a route of the first mobile ITS station and preset a version of software to update in the congestion estimated section. Thereafter, if entering the congestion estimated section, the first mobile ITS station can identify the second mobile ITS station having the preset software version and make a request for a file thereto.

For instance, assuming that a time taken for the first mobile ITS station to pass through the congestion estimated section is a first time, a request for a software update file, of which reception requires the first time, can be set to be made to another mobile ITS station in the congestion estimated section.

Figure 13:
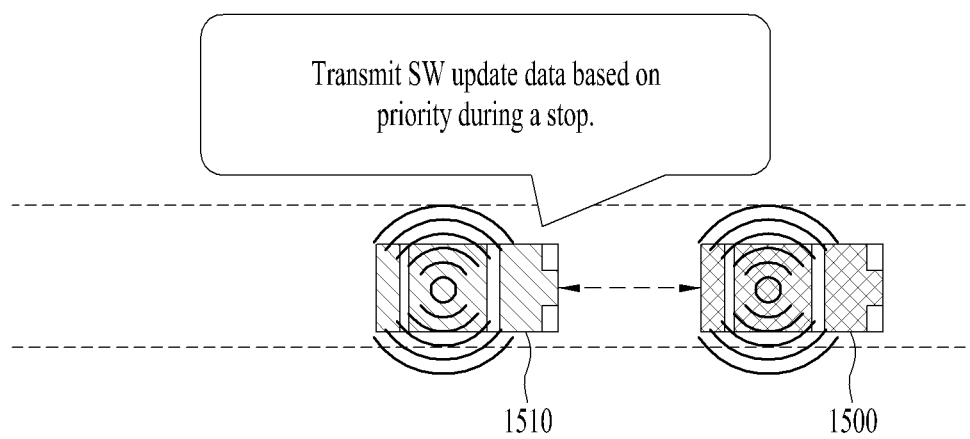

Next, FIG. 13 is a diagram illustrating a method for a first mobile ITS station to transmit/receive a message according to one embodiment of the present invention. Particularly, the present invention provides a method for a first mobile ITS station 1500 to receive a software update file by making a request for the software update file to a second mobile ITS station 1510 based on a prescribed priority.

A plurality of updatable software may exist in the first mobile ITS station 1500. In this instance, the first mobile ITS station 1500 can make a request for a software update file to the second mobile ITS station 1510 having an updatable version of software satisfying a prescribed condition. For instance, the prescribed condition can be met if the second mobile ITS station 1510 stops and the first mobile ITS station 1500 can complete the reception of the software update file within a stop estimated time (e.g., 5 minutes) of the second mobile ITS station 1510.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein. It will be appreciated by those skilled in the art that various modifications and variations can be made in the present specification without departing from the spirit or scope of the inventions. Thus, it is intended that the present specification covers the modifications and variations of this invention provided they come within the scope of the appended claims and their equivalents.

Both apparatus and method inventions are mentioned in this specification and descriptions of both of the apparatus and method inventions may be complementarily applicable to each other.

The above describe should not be restrictively interpreted in all aspects but considered exemplarily. Various modifications and variations can be made in the present invention without departing from the spirit or scope of the inventions, and the present invention covers the modifications and variations of this invention provided they come within the scope of the appended claims and their equivalents.

As described above, although the above embodiments of the present invention are described by exampling a system for which IEEE/3GPP based V2X is utilized, they can be variously utilized for V2X application systems to which the same principles are applied.

What is claimed is:

1. A method of controlling a first mobile Intelligent Transport System (ITS) station, the method comprising:
identifying a second mobile ITS station having a software version updatable on the first mobile ITS station based on receiving a message from at least one neighbor mobile ITS station through a first communication interface;
making a request for a software update file for the updatable software version to the second mobile ITS station through the first communication interface;
receiving the software update file from the second mobile ITS station while a connection to the second mobile ITS station is maintained through the first communication interface; and
if there are a plurality of software updatable on the first mobile ITS station, making a request for the software update file to the second mobile ITS station having an updatable version of software meeting a prescribed condition,
wherein the prescribed condition is met, if the second mobile ITS station stops and the reception of the software update file is completed within a stop estimated time of the second mobile ITS station.

2. The method of claim 1, wherein the identifying the second mobile ITS station comprises:
determining whether the second mobile ITS station drives a same route of at least one partial section of a route of the first mobile ITS station.

3. The method of claim 1, further comprising: while the software update file is received from the second mobile ITS station, maintaining a distance between the first mobile ITS station and the second mobile ITS station equal to or smaller than a preset value.

4. The method of claim 1, further comprising:
confirming a congestion estimated section of a route of the first mobile ITS station;
presetting a software version to update in the congestion estimated section; and
identifying the second mobile ITS station having the preset software version if the first mobile ITS station enters the congestion estimated section.

5. The method of claim 1, further comprising:
if a connection to the second mobile ITS station is disconnected while receiving the software update file, searching for a third mobile ITS station having the updatable software version; and
receiving a rest of the software update file from the third mobile ITS station.

6. The method of claim 1, wherein the first communication interface comprises a Dedicated Short Range Communication (DSRC) interface.

7. The method of claim 6, further comprising:
confirming a service channel having a lowest Channel Busy Ratio (CBR) among a plurality of channels of the DSRC interface through a control channel of the DSRC interface.

8. The method of claim 7, further comprising:
making a request for the software update file to the second mobile ITS station using the confirmed service channel; and
receiving the software update file from the second mobile ITS station.

9. The method of claim 1, further comprising:
if a connection to the second mobile ITS station is disconnected while receiving the software update file, receiving a rest of the software update file from the second mobile ITS station through a second communication interface different from the first communication interface.

10. The method of claim 9, wherein the second communication interface comprises ITS-G5 interface and LTE PC5 interface.

11. The method of claim 1, further comprising:
if the reception of the software update file is completed and the first mobile ITS station stops, rebooting a system of the first mobile ITS station.

12. A first mobile Intelligent Transport System (ITS) station, comprising:
a communication device; and
a processor configured to:
identify a second mobile ITS station having a software version updatable on the first mobile ITS station based on receiving a message from at least one neighbor mobile ITS station through a first communication interface,
make a request for a software update file for the updatable software version to the second mobile ITS station through the first communication interface,
receive the software update file from the second mobile ITS station while a connection to the second mobile ITS station is maintained through the first communication interface, and
if there are a plurality of software updatable on the first mobile ITS station, make a request for the software update file to the second mobile ITS station having an updatable version of software meeting a prescribed condition,
wherein the prescribed condition is met, if the second mobile ITS station stops and the reception of the software update file is completed within a stop estimated time of the second mobile ITS station.

* * * * *